United States Patent
Niina et al.

(10) Patent No.: US 11,428,262 B2
(45) Date of Patent: Aug. 30, 2022

(54) COMPLIANT BEARING FOR OILFIELD APPLICATIONS

(71) Applicant: MS Directional, LLC, Conroe, TX (US)

(72) Inventors: Nobuyoshi Niina, Yokohama (JP); Libo Yang, Houston, TX (US); Peter Nicholas Wells, Houston, TX (US)

(73) Assignee: MS Directional, LLC, Conroe, TX (US)

( * ) Notice: Subject to any disclaimer, the term of this patent is extended or adjusted under 35 U.S.C. 154(b) by 0 days.

(21) Appl. No.: 17/199,905

(22) Filed: Mar. 12, 2021

(65) Prior Publication Data
US 2021/0285489 A1    Sep. 16, 2021

Related U.S. Application Data

(60) Provisional application No. 62/990,054, filed on Mar. 16, 2020.

(51) Int. Cl.
| | | |
|---|---|---|
| *F16C 23/04* | (2006.01) | |
| *F16C 33/04* | (2006.01) | |
| *F16C 33/10* | (2006.01) | |

(52) U.S. Cl.
CPC .......... *F16C 23/045* (2013.01); *F16C 33/043* (2013.01); *F16C 33/1065* (2013.01);
(Continued)

(58) Field of Classification Search
CPC .... F16C 23/041; F16C 23/043; F16C 23/045; F16C 33/106; F16C 33/1065; F16C 33/20;
(Continued)

(56) References Cited

U.S. PATENT DOCUMENTS

| | | | |
|---|---|---|---|
| 3,683,474 A | | 8/1972 | Young, Jr. |
| 4,007,975 A | * | 2/1977 | Schutz ................. F16C 23/045 384/282 |

(Continued)

FOREIGN PATENT DOCUMENTS

| | | |
|---|---|---|
| DE | 149691 A5 * | 3/1980 |
| DE | 102013214979 B4 | 6/2020 |

(Continued)

OTHER PUBLICATIONS

FR2724700desc_machine_translation.*
WO2016076682desc_machine_translation.*

*Primary Examiner* — Phillip A Johnson
(74) *Attorney, Agent, or Firm* — Jackson Walker, LLP

(57) ABSTRACT

The present disclosure provides a bearing design that accommodates misalignment of a rotatable shaft in the bearing and is well suited to usage in a particulate-laden fluid. The bearing can be shaped with a curved surface along a longitudinal axis of the bearing, such as in a curved barrel shape or a ball shape, to provide a point contact instead of a line contact as is the case with conventional plain bearings. The point contact allows the bearing to adjust with a misalignment between ends of the shaft or between the external supports and facilitates the assembly and disassembly of the rotating shaft. Because the bearing compensates for misalignment, the bearing surfaces can have closer tolerances for a smaller gap between the bearing surfaces, which can result in improved performance.

14 Claims, 14 Drawing Sheets

(52) U.S. Cl.
CPC ...... *F16C 2206/04* (2013.01); *F16C 2206/40* (2013.01); *F16C 2206/82* (2013.01); *F16C 2352/00* (2013.01)

(58) Field of Classification Search
CPC ...... F16C 33/2206; F16C 33/04; F16C 33/40; F16C 33/56; F16C 33/58; F16C 33/60; F16C 33/82; F16C 2352/00; F16C 2380/26; H02K 5/167
See application file for complete search history.

(56) References Cited

U.S. PATENT DOCUMENTS

| | | |
|---|---|---|
| 4,076,343 A | 2/1978 | McCloskey |
| 4,132,452 A * | 1/1979 | Riegler ............... F16C 17/24 266/91 |
| 4,161,055 A | 7/1979 | Weremijenko |
| 5,186,546 A | 2/1993 | Abe |
| 5,463,811 A | 11/1995 | Aureli et al. |
| 7,828,482 B2 | 11/2010 | Beausoleil et al. |
| 8,069,933 B2 | 12/2011 | Sexton et al. |
| 8,500,333 B2 | 8/2013 | Osgood et al. |
| 9,593,533 B2 | 3/2017 | Kirkhope |
| 9,650,844 B2 | 5/2017 | Finke et al. |
| 10,393,176 B2 | 8/2019 | Peterson |
| 10,690,179 B2 | 6/2020 | Gharib et al. |
| 2008/0107365 A1 | 5/2008 | Mueller |
| 2020/0300042 A1 | 9/2020 | Peters |
| 2020/0300293 A1 | 9/2020 | Peters |

FOREIGN PATENT DOCUMENTS

| | | | |
|---|---|---|---|
| FR | 2724700 A1 * | 3/1996 | ............ F16C 33/043 |
| GB | 1512952 A | 6/1978 | |
| WO | WO-2016076682 A2 * | 5/2016 | .............. F16C 11/06 |

* cited by examiner

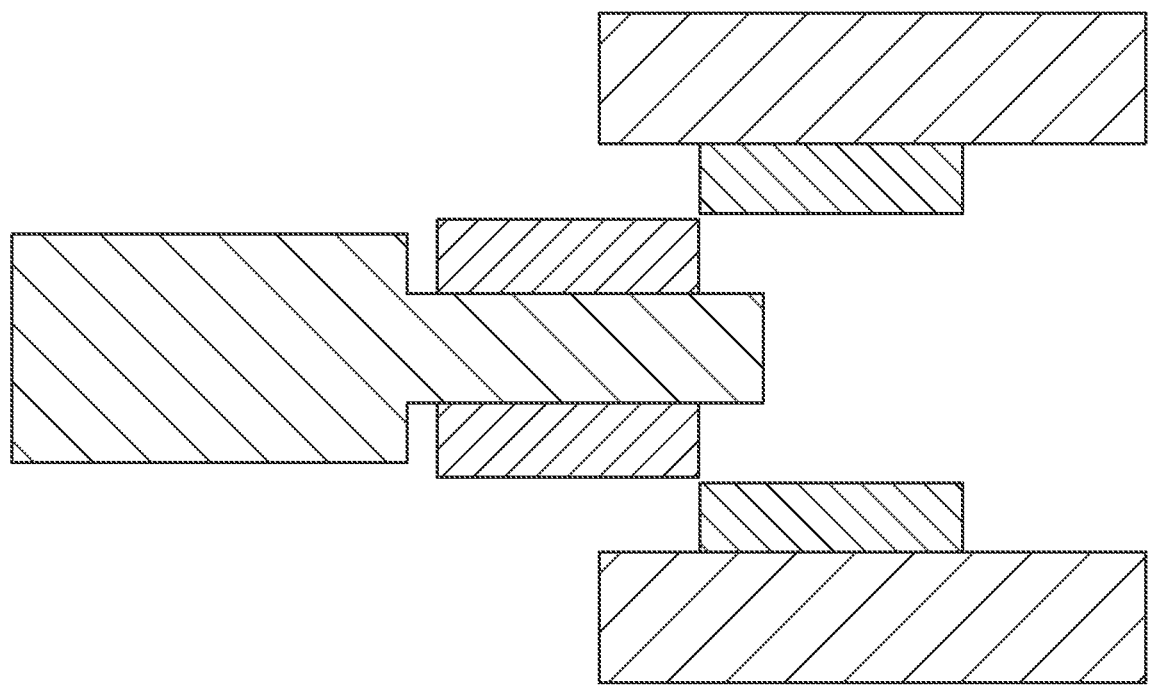
*FIG. 5*
*(Prior Art)*
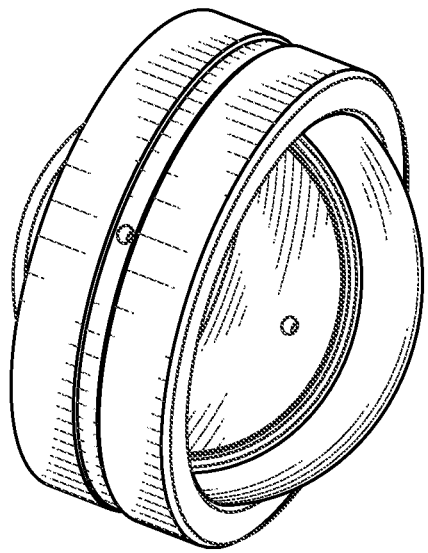  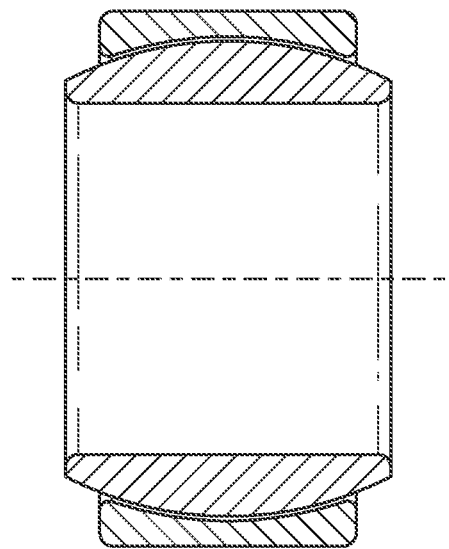
*FIG. 6A*  *FIG. 6B*
*(Prior Art)*  *(Prior Art)*

COMPLIANT BEARING FOR OILFIELD APPLICATIONS

CROSS REFERENCE TO RELATED APPLICATIONS

This application claims the benefit of U.S. Provisional Application No. 62/990,054, filed Mar. 16, 2020, entitled "Mud-lubricated Bearing", and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to bearings that can accommodate misalignment of a shaft. More specifically, the disclosure relates to bearings that can accommodate misalignment of a shaft and through which particulate-laden fluids flow, such as drilling fluids.

Description of the Related Art

FIG. 1 is an example of a typical journal bearing. FIG. 2 is an example of a typical radial bearing. Journal bearings (also known as "plain" bearings) or radial bearings are routinely used to transfer a load from a fixed object to a rotating object. Typical applications are pumps, motors, and other devices having a support for a rotating shaft. A journal bearing typically includes an outer ring (or "outer race") and an inner ring (or "inner race"). The outer ring is coupled to the support, such as a motor or pump housing, and the inner ring is coupled to a shaft. The interface between the inner periphery of the outer ring and the outer periphery of the inner ring forms a longitudinal line contact along a longitudinal axis through the bearing to stabilize the shaft in the body. The line contact orientation revolves around the outer ring as the inner ring and shaft rotate forming a wear interface around the interface periphery. To reduce the wear, lubricants are used and often sealed in the journal bearing assembly with seals on the side faces of the rings. In other installations, lubrication is periodically or continually provided to the bearing without the seals. In such instances, the lubrication is typically free of particulates that would aggressively cause increased wear at the interface. Some extreme duty applications include oil field drilling that uses mud drilling fluid with particulates. The mud requires hardened materials to reduce the wear and extend life of rotating equipment. In some installations, the interface surfaces are formed of hardened base material and in other installations, inserts are coupled to the base materials and formed of a very hard material, such as a carbide, including tungsten carbide, or polycrystalline diamond ("PCD"). For example, a PCD layer can be sintered on a tungsten carbide substrate, and a series of PCD inserts can be brazed and assembled in the bearing inner and outer rings at their interface. Radial bearings typically also have an outer ring and an inner ring, but interpose a set of balls or rollers between the rings. As the inner ring rotates, the balls or rollers rotate and revolve around the inner ring, which reduces wear on the inner ring and outer ring.

FIG. 3 is a schematic cross sectional view of an ideal alignment of an assembly of a shaft longitudinally disposed between two typical plain bearings. The plain bearings have a longitudinal line contact as the bearing components rotate relative to each other. The plain bearings also have a longitudinal line contact between the bearing surfaces, if a bearing component slides longitudinally relative to a mating bearing component. These types of bearings have two degrees of freedom—a rotating motion around a longitudinal axis of the outer ring defining a Z-axis, and a sliding motion with respect to the Z-axis limited by stops on the shaft longitudinal movement. A gap of the plain bearings can be a few thousandth of inch between the rings. Therefore, the plain bearings do not allow any significant misalignment between the bearings when they are mounted, for example, on a rotating shaft and to an external support to support the bearings, as illustrated.

Under ideal conditions, the wear can be minimized when the shaft, bearings, and external support are aligned as shown in FIG. 3. An external support 100 includes two bearings 102A and 102B. Each bearing 102 includes an outer ring 104 and an inner ring 106, labeled "A" and "B" for their respective bearing. Each outer ring defines an outer ring longitudinal axis 108. The outer ring longitudinal axis 108A is aligned with outer ring longitudinal axis 108B. There is no misalignment. A shaft 110 is coupled with the inner rings 106A and 106B. The shaft 110 defines a shaft longitudinal axis 112 through the center of the shaft portions that rotate with their inner rings 106 inside the outer rings 104. Because there is no misalignment, the shaft longitudinal axis aligns with both of the outer ring longitudinal axes 108A and 108B. The reality is that conditions are rarely ideal.

FIG. 4 is a schematic cross sectional view of FIG. 3, but with a misaligned assembly of a shaft longitudinally disposed between the two typical plain bearings. Misalignment of the shaft is the normal condition. The outer ring longitudinal axis 108A of bearing 102A is offset by a distance M from the outer ring longitudinal axis 108B of bearing 102B. When the inner rings 106A and 106B with the shaft 108 try to fit in the outer rings 104A and 104B, if there is enough clearance to allow a misalignment of angle Φ, then the bearing may be assembled and function. If there is not enough clearance, then the bearing may not be able to be assembled together or the bearing will have difficulty functioning even with assembly. The misalignment causes a shorter life due to interference of adjacent surfaces (also known as "binding"), and can cause fluctuations in efficiency and performance of the associated device, such as a motor or pump.

Plain bearings are a typical type of bearing used in drilling mud applications. The rotating shaft is supported with the plain bearing, which may be comprised of a PCD or tungsten carbide plain bearing at each end. The inner ring (or "inner carrier") can be firmly fitted or keyed on the rotating shaft and the outer ring (or "outer carrier") can be secured with a radial feature on the external support. A gap of those bearings is typically a few thousandths of an inch between the inner and outer rings. If the inner ring and outer ring are part of a rotor (magnets) and stator (coils) in an electrical motor or generator, the rotor wobbles within the gap, so that a distance between the stator and rotor varies depending on the wobbling. That much gap is normally useful for the typical components to be assembled and function within their confines, but that much clearance also causes wobbling. A magnetic field in a motor or generator is very sensitive to a clearance or gap between a stator and a rotor. Hence, the wobbling motion can cause inconsistent power or power variation.

FIG. 5 is a schematic cross sectional view of a shaft with a typical inner ring shown being installed inside a typical outer ring of a bearing coupled to an external support. When the external support is misaligned or the rotor ends are not concentric due to manufacturing tolerances, these bearings may have installation difficulty due to the misalignment, and even when possible, such efforts are often time consuming.

FIG. 6A is an example of a typical spherical bearing. FIG. 6B is schematic cross section of the spherical bearing in FIG. 6A. A spherical bearing includes an outer ring, an inner ring, and a locking shape that makes the inner ring captive within the outer ring in the longitudinal axial direction only. The outer surface of the inner ring and the inner surface of the outer ring are correspondingly spherical and they slide against each other during rotation of the bearing. The bearing allows misalignment to be compensated better. The bearing permits angular rotation about a center point in two orthogonal directions (usually within a specified angular limit based on the bearing geometry). Typically, these bearings support a rotating shaft in the bore of the inner ring that must move not only rotationally, but also at an angle. The spherical bearing has three degrees of freedom, namely, rotation around a longitudinal axis of the outer ring defining a Z-axis, and limited angular movement in the X-axis and Y-axis that are transverse to the longitudinal Z-axis through the bearing.

The concave surface of the outer ring stops the inner ring movement longitudinally along the Z-axis and thus forms a locking shape to maintain the inner ring with the outer ring longitudinally and is not intended or capable of ready disassembly. Therefore, a spherical bearing application typically requires full or ready access to the bearing, shaft, and support to remove the whole bearing, because the parts are not readily capable of disassembly. For many applications wherein full or ready access is unavailable, a spherical bearing is unsuitable.

The oil field is one such environment with bearing applications that require extreme conditions (particle-laden lubricants), tight tolerances, and readily serviceable assemblies. In some applications with a motor stator and rotor that is fluid cooled with particle-laden drilling fluids and tight tolerances between the stator and rotor for motor efficiency, it is important that the rotor can be readily removed from inside the surrounding stator of the motor. The combination of these three operating conditions makes the existing solutions impractical, if not unworkable.

Therefore, there remains a need for an improved bearing capable of accommodating misalignment of a rotatable shaft that can be readily disassembled and more capable of allowing particulate-laden fluids to pass through the bearing.

BRIEF SUMMARY OF THE INVENTION

The present disclosure provides a bearing design that accommodates misalignment of a rotatable shaft in the bearing and is well suited to usage in a particulate-laden fluid. The bearing can be shaped with a curved surface, as described herein, along a longitudinal axis of the bearing, such as in a sphere shape or curved barrel shape, to provide a point contact instead of a line contact as is the case with conventional plain bearings. The point contact allows the bearing to adjust with a misalignment between ends of the shaft or between the external supports and facilitates the assembly and disassembly of the rotating shaft. Because the bearing compensates for misalignment, the bearing surfaces can have closer tolerances for a smaller gap between the bearing surfaces, which can result in improved performance.

The disclosure provides a bearing, comprising: an outer ring having an inside periphery defining a longitudinal axis; and an inner ring having an outside periphery configured to rotatably fit within the inside periphery of the outer ring, the bearing configured to allow four degrees of freedom movement between the inner ring and the outer ring of relative rotational movement around the longitudinal axis, relative angular movement in a plurality of directions transverse to the longitudinal axis, and relative longitudinal movement along the longitudinal axis.

The disclosure also provides a rotatable electromagnetic device, comprising: a stator having an inside periphery, and configured to be coupled to a bearing outer ring with an inside periphery defining a longitudinal axis; and a rotor having an outside periphery configured to rotationally fit within the inside periphery of the stator and comprising at least one bearing inner ring with an outside periphery configured to rotatably fit within the inside periphery of the bearing outer ring to establish a bearing, and the bearing inner ring configured to allow four degrees of freedom movement between the inner ring and the outer ring of relative rotational movement around the longitudinal axis, relative angular movement in a plurality of directions transverse to the longitudinal axis, and relative longitudinal movement along the longitudinal axis.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 5 is a schematic cross sectional view of a shaft with a typical inner ring shown being installed inside a typical outer ring of a bearing coupled to an external support.

FIG. 6A is an example of a typical spherical bearing.

FIG. 6B is schematic cross section of the spherical bearing in FIG. 6A.

DETAILED DESCRIPTION

Figure 1:
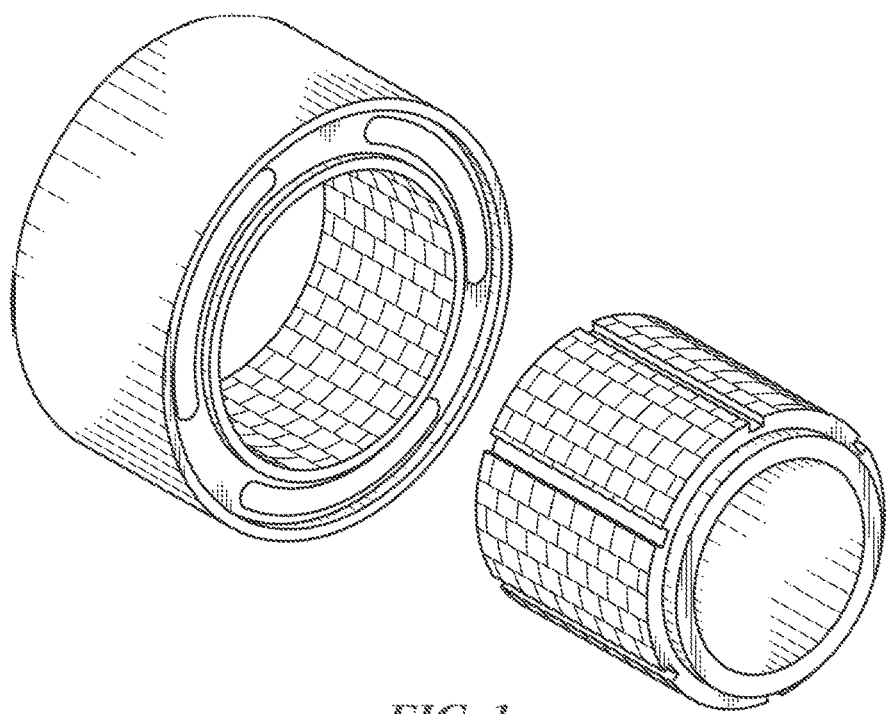
FIG. 1 is an example of a typical journal bearing.
Figure 2:
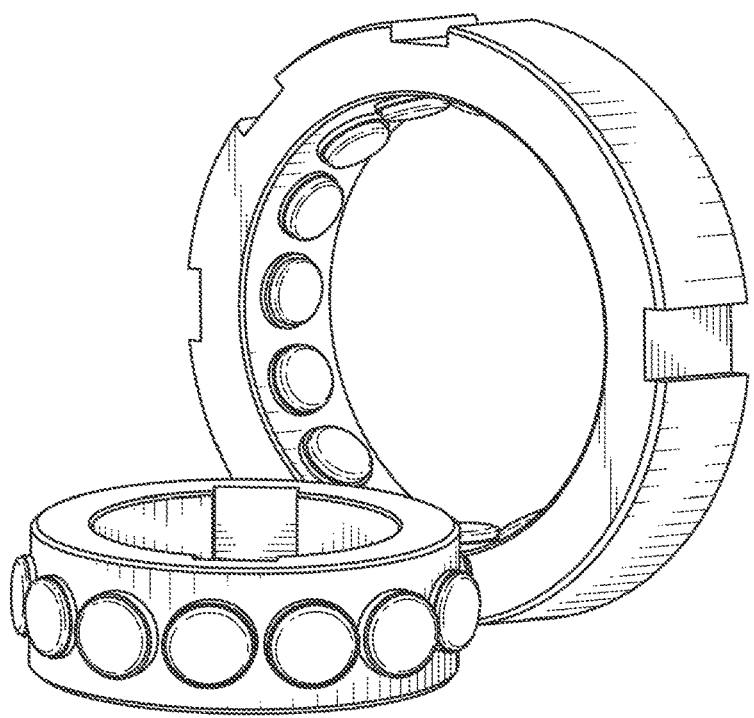
FIG. 2 is an example of a typical radial bearing.
Figure 3:
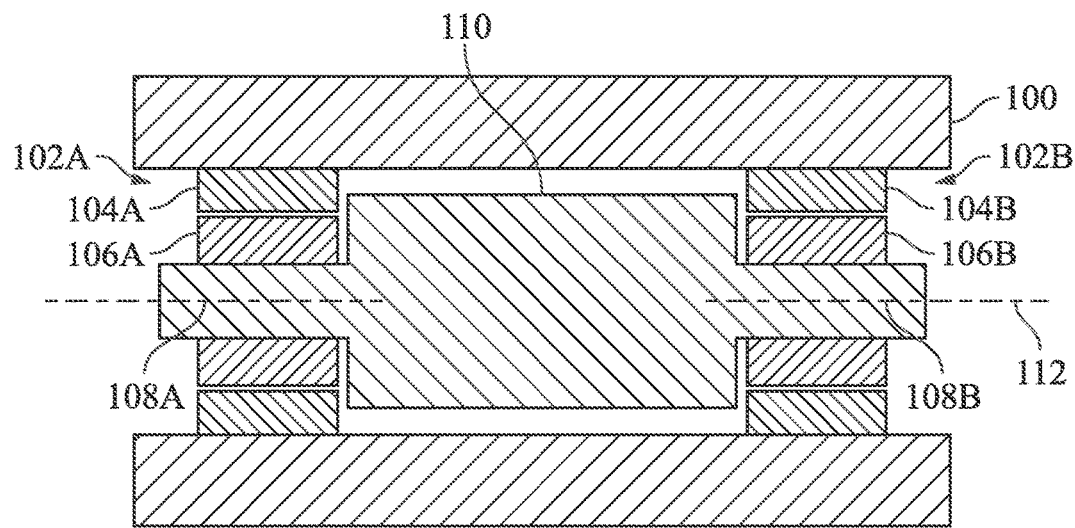
FIG. 3 is a schematic cross sectional view of an ideal alignment of an assembly of a shaft longitudinally disposed between two typical plain bearings.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up', "upward', "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments are disclosed that use various element numbers for like elements. The term "ring" or "race" herein is used broadly and can have various cross sectional shapes, including non-uniform wall thicknesses along a longitudinal axis, such as curved shapes.

The present disclosure provides a bearing design that accommodates misalignment of a rotatable shaft in the bearing and is well suited to usage in a particulate-laden fluid. The bearing can be shaped with a curved surface along a longitudinal axis of the bearing, such as in a curved barrel shape or a ball shape, to provide a point contact instead of a line contact as is the case with conventional plain bearings. The point contact allows the bearing to adjust with a misalignment between ends of the shaft or between the external supports and facilitates the assembly and disassembly of the rotating shaft. Because the bearing compensates for misalignment, the bearing surfaces can have closer tolerances for a smaller gap between the bearing surfaces, which can result in improved performance.

Figure 7:
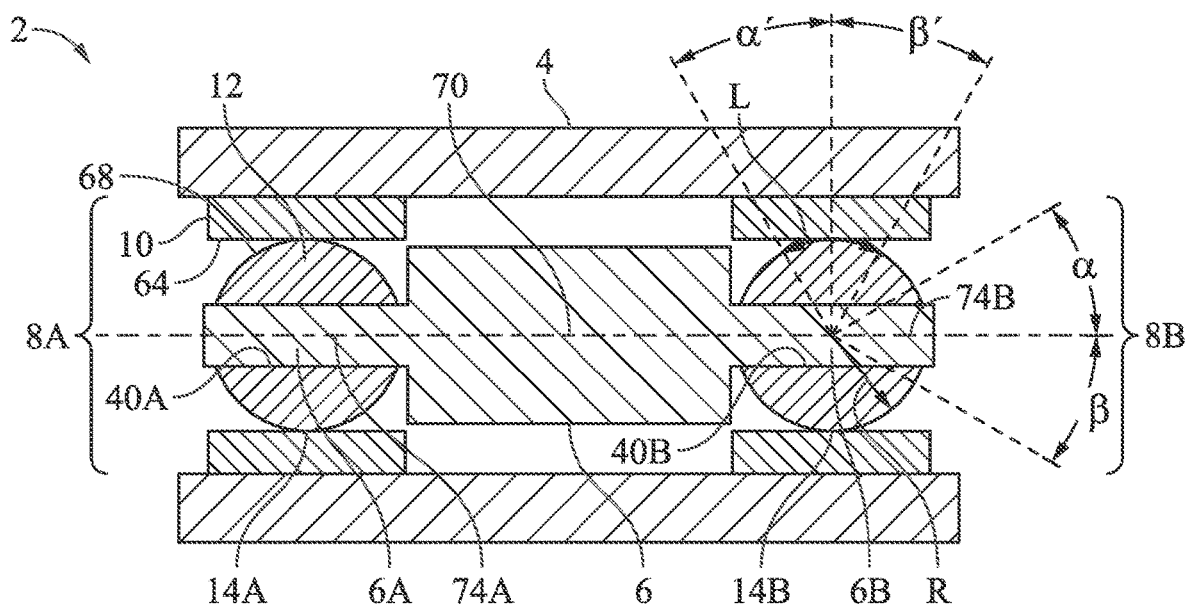
FIG. 7 is a schematic cross sectional view of an embodiment of the invention having an external support coupled to a shaft longitudinally between two alignment compliant bearings.

FIG. 7 is a schematic cross sectional view of an embodiment of the invention having an external support coupled to a shaft longitudinally between two compliant bearings. Generally, a device 2 includes an external support 4 that supports a shaft 6 within the external support through at least one bearing 8, and generally two bearings 8A and 8B. The bearing 8 generally includes an outer ring 10 with an inner ring 12 sized to fit within the outer ring, where the outer ring or inner ring rotates relative to the other ring. The inner periphery (generally the inner diameter) of the outer ring defines an outer ring longitudinal axis 74, that is, outer ring longitudinal axis 74A for outer ring 10A and outer ring longitudinal axis 74B for outer ring 10B. The outer rings 10 can be coupled to the external support 4. The inner rings 12 can be coupled to the shaft 6. A shaft portion 6A can fit a bore 40A of the inner ring 8A and a shaft portion 6B can fit a bore 40B of the inner ring 8B. The shaft 6 can rotate within a stationary external support 4, or the external support can rotate around a stationary shaft.

The bearings 8A and 8B have inner rings 12 with a longitudinal curved surface 68. The curved surface is in three dimensions. In this embodiment, the curved surface 68 is spherically shaped. However, the outer ring 10 has an inside periphery 64 with a cylindrical surface, having a constant diameter for at least a length that engages the inner ring 12. The cylindrical inside periphery 64 does not match the curved surface 68, unlike the concave mating spherical surface in the typical spherical bearing described in FIGS. 6A and 6B. The unmatched cylindrical surface of the outer rings 10 with the curved surface of the inner rings 12 of the bearings 8A and 8B can form a nominal point contact 14A and 14B on bearings 8A and 8B, respectively. The point contact is "nominal" according to the truism that a curve intersects a straight line at one point. However, physical realities such as material porosity that creates gaps in the surface, surface patterns and openings, and the like could cause both sides of a gap, pattern, or opening to contact the outer ring surface. Such physical variations do not depart from the principal of a nominal point contact of a shaped three-dimensional curve with a flat surface. Further, the bearing surfaces can be separated in reality by a thin film, such as lubricant, between the inner and outer rings. Also, the location of the point contact can occur at a different peripheral location between the outer ring and inner ring during rotation and partially depends on the loads, orientation relative to gravity of the device, and other factors.

Figure 4:
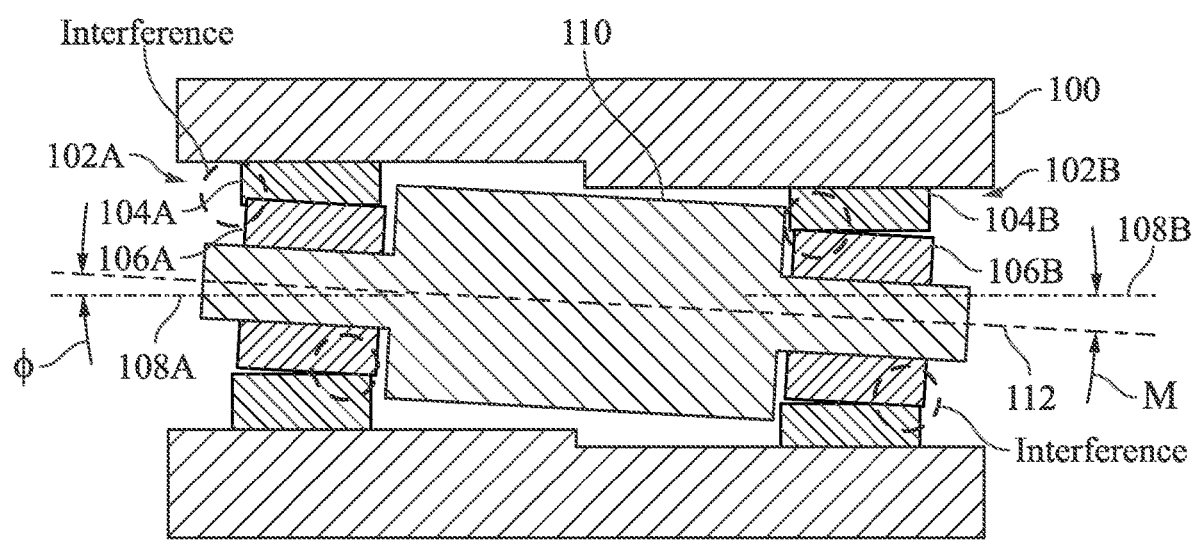
FIG. 4 is a schematic cross sectional view of a misaligned assembly of a shaft longitudinally disposed between two typical plain bearings.

The ability to orient angularly the shaft in the bearing with some amount of misalignment through the point contact interface between the outer ring 10 and the inner ring 12 allows the rings to rotate relative to each other without the interference due to the misalignment. The shaft 6 with the shaft longitudinal axis 70 can be misaligned through an angle "$\alpha$" relative to at least one of the outer ring longitudinal axes 74 in one direction and an angle "$\beta$" relative to at least one of the outer ring longitudinal axes 74 in an opposite direction. The angles $\alpha$ and $\beta$ could be the same or different depending on the amount of misalignment in each direction. Such freedom of angular movement is in contrast to the prior art interference described relative to FIG. 4. Because the angular movement can reduce binding from misalignment between the bearing interfaces, a gap between the outer ring 10 inner diameter and the inner ring 12 outer diameter can be very small, such as a thousandth of one inch (0.001" or 0.0254 mm). Such a small gap can be several times smaller than a typical bearing gap described in the background section. The small gap with a close tolerance is a significant result of the bearings 8 permitting angular movement of the inner ring in multiple axes of freedom, shown in FIG. 10 below. The small gap can still allow a fluid film lubrication between the surfaces, but the wobbling discussed above can be significantly reduced.

In at least one embodiment, the curved surface 68 of the inner ring is formed at a radius R from an origin O on the inner ring 14 (illustrated on the inner ring 14B in FIG. 7) along the outer ring longitudinal axis 74. The outer diameter of the inner ring 12, that is 2R, is advantageously a small amount less than the inner diameter of the outer ring 10 to form the gap for clearance. The radius R is the maximum radial distance of the inner ring curved surface along at least a minimum length L. When nonconformities to the curved surface such as openings as described in FIGS. 20A-20D and indentions as described in reference to FIG. 22, the radius R would extend to a projected line over the space of the grooves and indentions. The minimum length L of the curved surface can vary, and is configured to be at least as long as is needed to allow the inner ring curved surface 68 to contact with the outer ring cylindrical surface throughout an angle "α" relative to a perpendicular line to the outer ring longitudinal axis 74 in one direction and an angle "β" relative to the perpendicular line to the outer ring longitudinal axis 74 in an opposite direction (which angles could have the same value or be different). Generally, the amount of angles α' and β' will be the same as the amount of allowable misalignment of the shaft longitudinal axis 70 relative to the outer ring longitudinal axis 74.

For extreme duty applications, such as those with fluids laden with particulates, the bearing material is advantageously hard and tough. Examples of material include carbides, such as tungsten carbide, ceramics, such as silicon nitride, and "polycrystalline diamond" ("PCD") (although PCD may be more expensive and unnecessary with the inventive design). Other options are a "diamond like carbon" ("DLC") coating on a metal substrate, or a PCD ring with a barrel shape.

Figure 8:
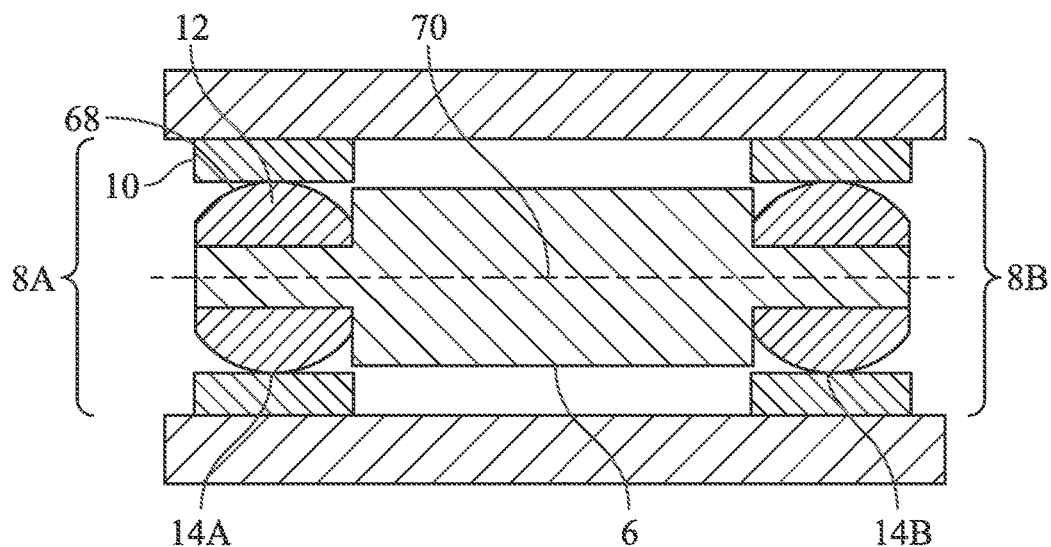
FIG. 8 is a schematic cross sectional view of another embodiment of the invention having an external support coupled to a shaft longitudinally between two compliant bearings.

FIG. 8 is a schematic cross sectional view of another embodiment of the invention having an external support coupled to a shaft longitudinally between two compliant bearings. In this embodiment, the curved surface 68 of the inner ring 12 is barrel shaped, that is, the curved surface can be truncated so that it is not continuous to at least an inside diameter of the inner ring that can be coupled to a shaft. The barrel shape can meet the functional requirements of providing the degrees of freedom for the bearing 8 to align itself, even when the shaft 6 is misaligned. Other curved surfaces are possible, such as interrupted or segmented curved shapes, that follow a radius through the angle of misalignment according to the principles discussed regarding FIG. 7.

Figure 9:
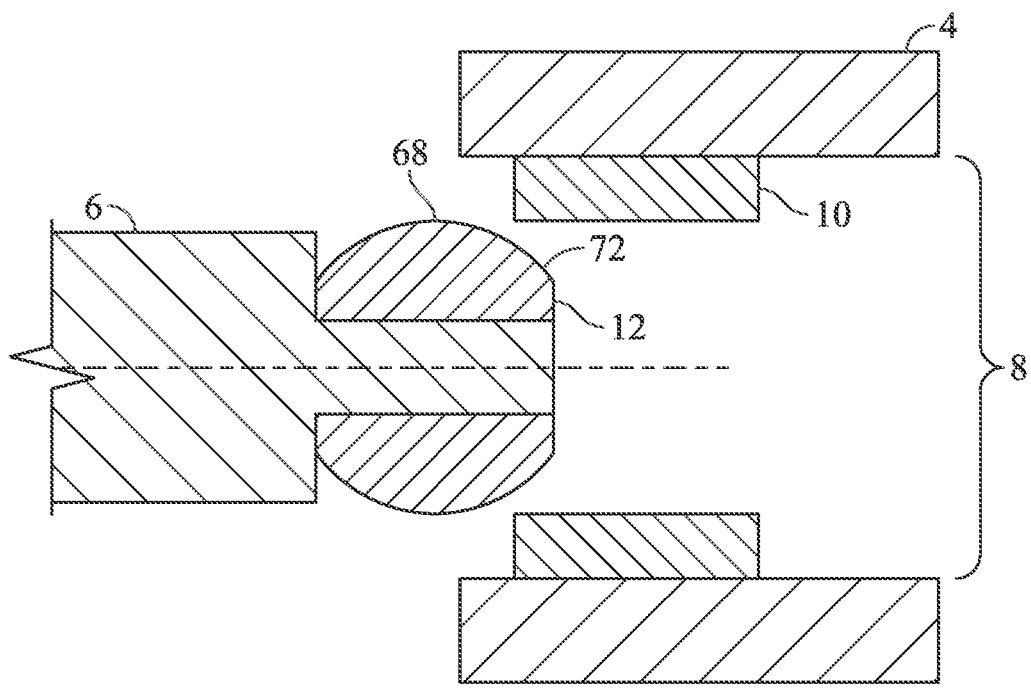
FIG. 9 is a schematic depiction cross sectional view of the invention having an external support coupled to a shaft with a compliant bearing having an inner ring formed with an integrated lead-in surface ready for installing into an outer ring of the bearing.

FIG. 9 is a schematic depiction cross sectional view of the invention having an external support coupled to a shaft with a compliant bearing having an inner ring formed with an integrated lead-in surface, ready for installing into an outer ring of the bearing. Assembly and maintenance are important, particularly in a fluid system with particulates, such as a mud drilling system in oil field operations. A conventional plain bearing requires a separately formed lead-in feature and a delicate operation to avoid damaging the brittle bearings made of tungsten carbide or PCD and others, referenced above regarding FIG. 1.

Unlike conventional plain bearings, the invention with its curved surface 68 of the inner ring 12 has a ready-made lead-in 72 starting at a leading edge of an inner ring. The lead-in 72 has a reduced diameter relative to an inner diameter of the outer ring 10. The lead-in 72 assists the inner ring 12 as the inner ring is inserted into an end portion of the outer ring 10 to self-align into the outer ring inner diameter. During assembly, the lead-in 72 allows ease of insertion of the inner ring into the outer ring (or conversely, the outer ring over the inner ring). As the shaft with the inner ring and the external support with the outer ring are slid together, the lead-in 72 will engage the inner diameter of the outer ring and help align the remainder of the inner ring 12 into the outer ring. This lead-in capability is an inherent self-aligning feature of the longitudinal curved surface design. Even if the external support is misaligned, these bearings can be readily installed and assembled with the lead-in from the curved surface and use the compliant feature to complete the alignment of the inner ring with the outer ring. Hence, the installation and removal of the inner ring and associated shaft are relatively easy compared to conventional plain bearings, and may occur without specialized tooling for alignment.

Figure 10:
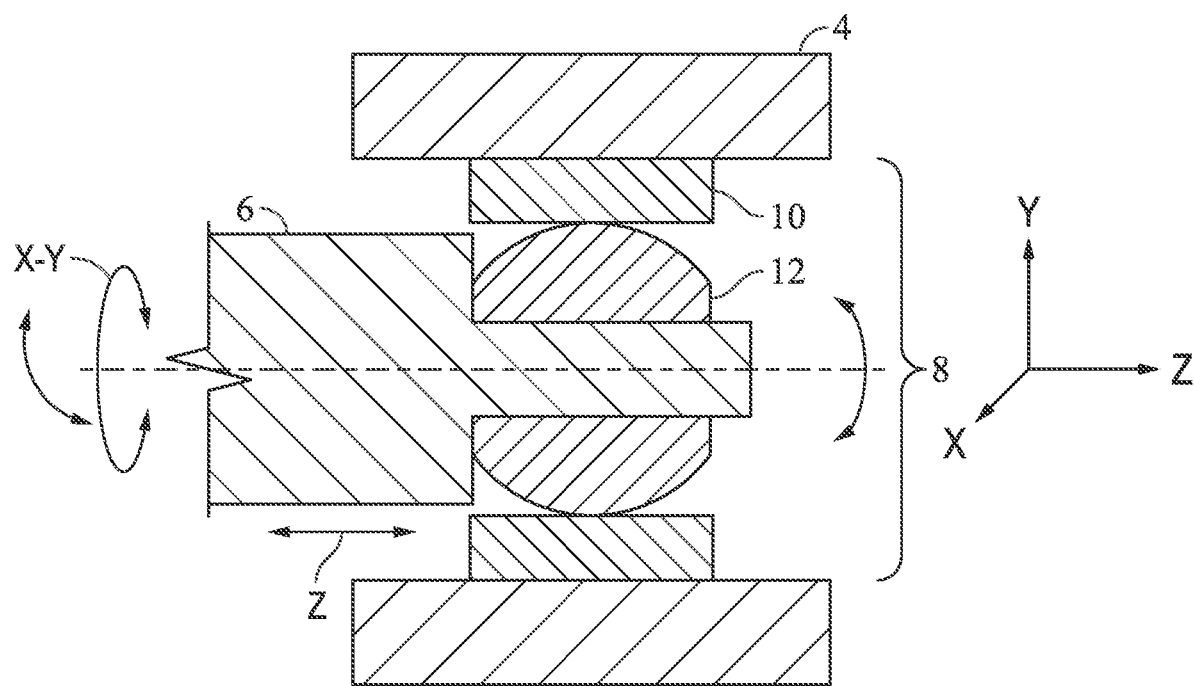
FIG. 10 is a schematic cross sectional view of the invention having an external support coupled to a compliant bearing with four degrees of freedom.

FIG. 10 is a schematic cross sectional view of the invention having an external support coupled to a compliant bearing with four degrees of freedom. The bearing 8 has at least four degrees of freedom relative to an outer ring longitudinal axis 74 defining a Z-axis, namely, one degree of freedom of rotation around the outer ring longitudinal axis 74, two degrees of freedom of angular movement in the X-axis and Y-axis that are orthogonally transverse to the outer ring longitudinal axis 74 (Z-axis), and one degree of freedom of longitudinal movement along the outer ring longitudinal axis 74. The bearing 8 generally does not have a concave surface of the outer ring as does the spherical bearing illustrated in FIGS. 6A and 6B that stops the inner ring longitudinal movement along the longitudinal axis 74.

The compliant feature and four degrees of freedom works with a wide latitude of axial gaps or motions. This flexible feature also helps with the designing of related system components, such as actuators, including a mud-lubrication actuator. In addition to being particularly suitable for mud drilling applications, other applications include mining applications and other applications with fluids having particulates. Applications not having fluid laden with particulates are also suitable for the bearing 8.

Figure 11:
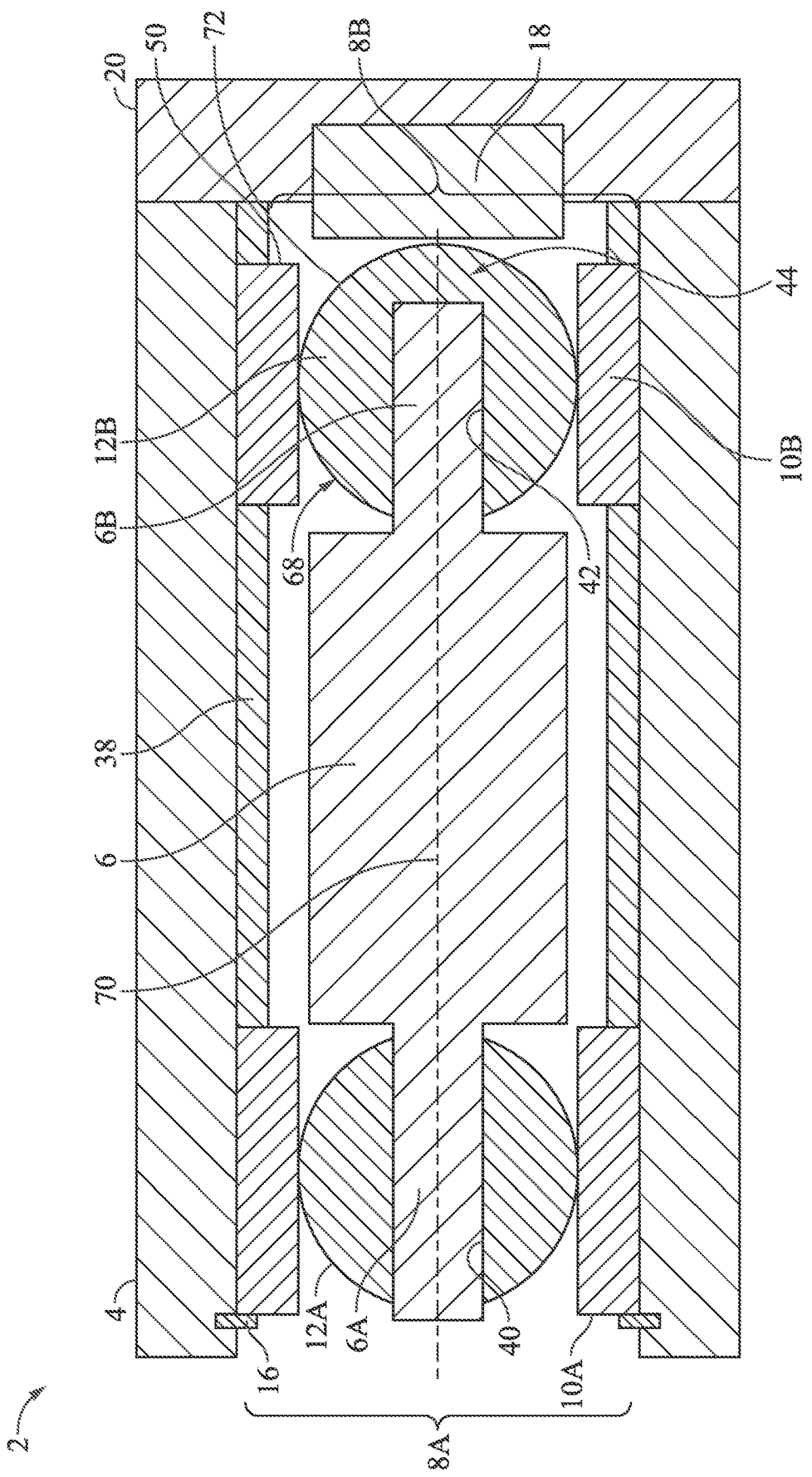
FIG. 11 is a schematic cross sectional view of another embodiment of the invention having an external support coupled to a shaft longitudinally between two compliant bearings with a rotational thrust bearing and a thrust bearing.

FIG. 11 is a schematic cross sectional view of another embodiment of the invention having an external support coupled to a shaft longitudinally between two compliant bearings with a rotational thrust bearing and a thrust bearing. This embodiment is similar in several ways to the embodiment illustrated in FIG. 7. However, the external structure 4 includes an end support 20 and restrains the inner rings 12 of the bearings 8 in at least one longitudinal direction. In this and other embodiments, the restraint is independent of the bearing itself, that is, external to the bearing. The embodiments shown are in contrast to such existing designs as the spherical bearing shown in FIGS. 6A and 6B where the locking longitudinal restraint is part of the bearing. The embodiment shown enables a simplified removal of bearing components and repair or replacement that is especially important in field operations to reduce downtime.

The device 2 generally includes the external support 4 that supports the shaft 6 through at least one bearing 8, and generally through two bearings 8A and 8B. The outer rings 10A and 10B are generally coupled to the external support 4, and the inner rings 12A and 12B are generally coupled to the shaft 6. The outer ring 10B is restrained from longitudinal movement by a shoulder 50 on the external support 4 on one side of the outer ring and by a spacer 38 on the other side. The outer ring 10A is restrained from longitudinal movement by the spacer 38 on a distal end of the spacer from the outer ring 10A and a retainer 16 on the other side of the outer ring 10A. However, the shaft 6 and inner rings 12 are not longitudinally restrained in a given position due to the structure of the bearings 8, but can move in a longitudinal direction opposite from an end support 20. In this embodiment, the shaft 6 can have a shaft portion 6A to fit a bore 40 through the inner ring 12A of the bearing 8A and a shaft portion 6B to fit into a partial bore 42 of the inner ring 12B of the bearing 8B. The partial bore 42 in the inner ring 12B allows a remaining portion of the inner ring to form an inner ring end surface 44. The end support 20 of the external support 4 includes a thrust disk 18 to function as a longitudinal axial thrust bearing, as do other thrust disks described in this disclosure. The thrust disk 18 can be stationary in rotation and in some embodiments movable longitudinally and therefore is sometimes referenced herein as a stationary thrust disk. The ring end surface 44 rotates with the shaft 6 and effectively forms a rotational thrust bearing that interfaces with the thrust disk 18. The outer ring 10B is restrained from longitudinal movement by a shoulder 50 on the external support 4 on one side of the outer ring and by a spacer 38 on the other side. The outer ring 10A is restrained from longitudinal movement by the spacer 38 on a distal end of the spacer from the outer ring 10A and a retainer 16 on the other side of the outer ring 10A. However, the shaft 6 and inner rings 12 are not restrained in a given position along the longitudinal axis 70 due to the structure of the bearings 8, but can move in a longitudinal direction opposite from the thrust disk 18. The shaft 6 can rotate within the external support 4 or the external support can rotate around the shaft, but the shaft with the bearings 8 are longitudinally restrained in the direction of the end support 20 by the engagement of the inner ring end surface 44 with the thrust disk 18.

Among various applications, this embodiment can especially be useful when oriented with the bearing 8A being gravitationally higher than the bearing 8B. The bearing 8B can rotate with at least a gravitational axial force applied to the thrust disk 18 to maintain the shaft 6 in a lower longitudinal position generally in contact with the thrust disk. However, if maintenance or replacement is required for the shaft 6 or inner rings 12, the assembly of the shaft with the inner rings can be readily removed to a position above the devise 2. The maintained or replacement assembly can then be reinserted, even from a remote location with the advantage of the lead-in 72 of the curved surface 68 assisting the inner ring 12B to self-align into the outer ring 10A and the progress to self-align into outer ring 10B.

Figure 12:
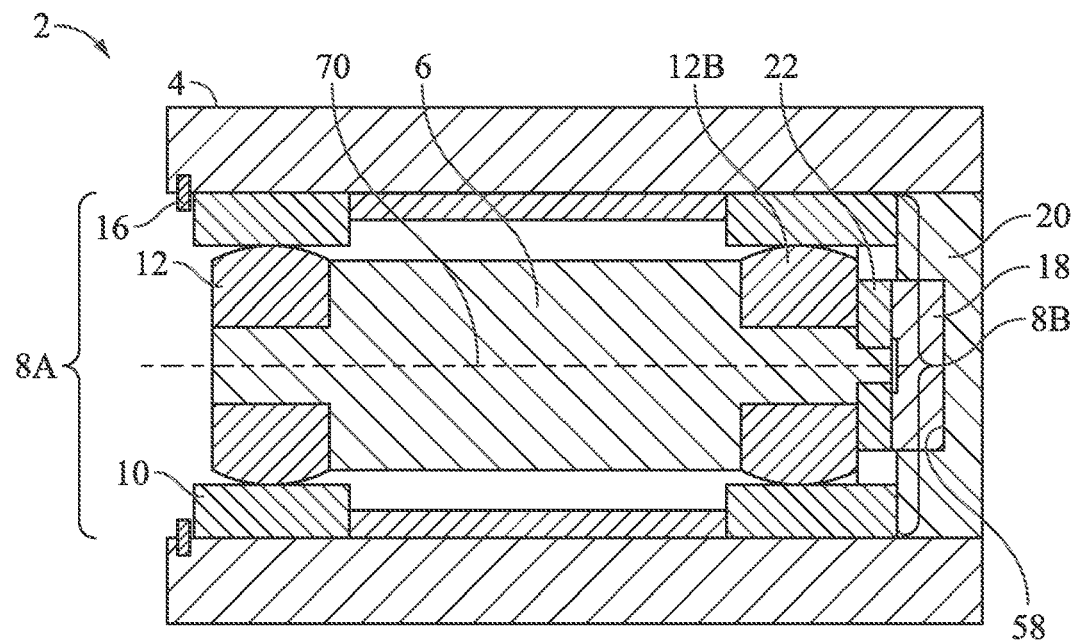
FIG. 12 is a schematic cross sectional view of another embodiment of the invention having an external support coupled to a shaft longitudinally between two compliant bearings with a stationary thrust bearing and a rotational thrust bearing.

FIG. 12 is a schematic cross sectional view of another embodiment of the invention having an external support coupled to a shaft longitudinally between two compliant bearings with a stationary thrust bearing and a rotational thrust bearing. This embodiment has a similar structure to FIG. 11 and further adds the rotational thrust disk 22 to interface with the thrust disk 18. In at least this embodiment, the thrust disk 18 can be at least rotationally stationary and coupled with the end support 20. The rotational thrust disk 22 can be coupled to the shaft 6. Rotation of the shaft 6 causes the rotation of the rotational thrust disk 22. The face of the rotational thrust disk 22 can rotate against the face of the stationary thrust disk 18. The shaft 6 is restrained in at least one longitudinal direction and supported, even if the bearing 8A is positioned at a higher elevation than bearing 8B.

Figure 13:
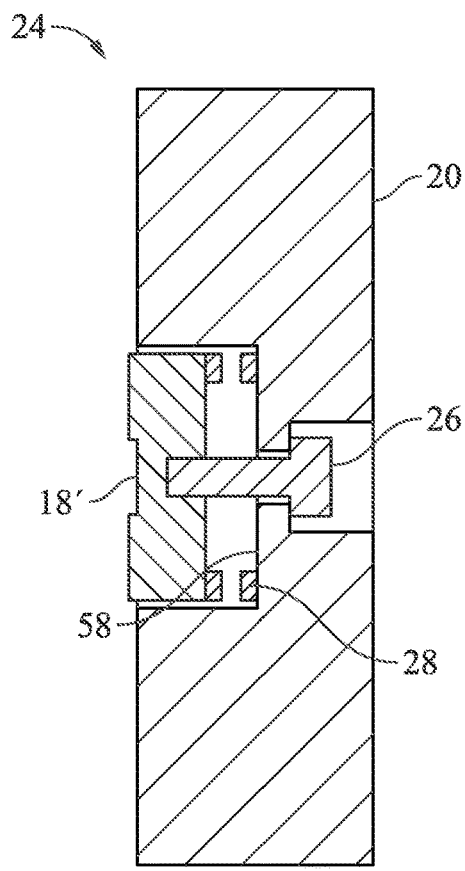
FIG. 13 is a schematic cross sectional view of another embodiment of the end support and a thrust bearing that can be used on multiple device embodiments.

FIG. 13 is a schematic cross sectional view of another embodiment of the end support and a thrust bearing that can be used on multiple device embodiments. This end support embodiment has a similar structure to FIGS. 11 and 12 and further provides an adjustable thrust disk assembly 24 for a thrust disk 18'. A cavity 58 can be formed in the end support 20 to support the thrust disk assembly 24. A thrust disk 18' that is rotationally stationary but moveable longitudinally can be coupled to the end support 20 with an retainer 26, such as a screw or bolt, passing through an opening from the outside of the end support. A bias element 28 can be placed in the cavity 58 between the thrust disk 18' and the end support 20. The bias element 28 can be a spring, including a wave spring or coil spring. The bias element 28 with the retainer 26 allows the surface of the thrust disk 18' to be longitudinally moved to adjust the contact position and the contact force of thrust disk 18' against the shaft 6 and associated inner ring 12B in FIGS. 11 and 12 and other embodiments throughout this disclosure. Further, if the shaft 6, and therefore the rotational thrust disk 22 coupled to the shaft, is misaligned relative to the outer ring longitudinal axis 74B in FIGS. 11 and 12, the thrust disk 18' can orient angularly relative to the outer ring longitudinal axis 74B to interface more axially with the rotational thrust disk 22. The flexible angular orientation allows the thrust disk 18' to engage more evenly the face of the rotational thrust disk 22, even with some misalignment of the shaft.

Figure 14:
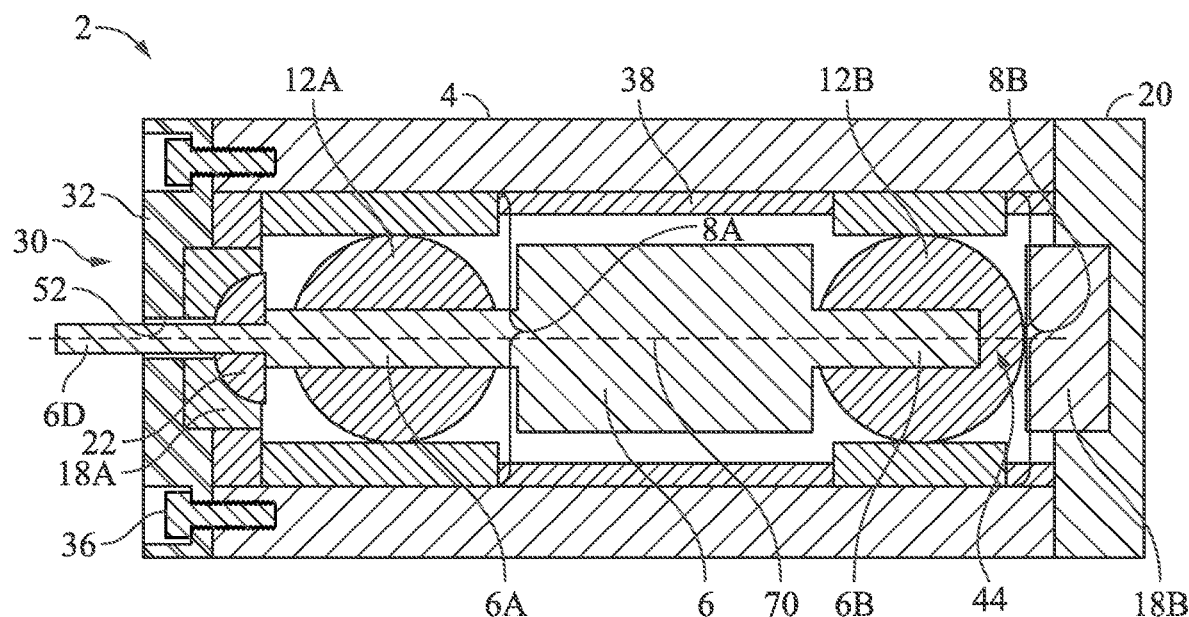
FIG. 14 is a schematic cross sectional view of another embodiment of the invention having an external support coupled to a shaft longitudinally between two compliant bearings with a thrust bearing and a longitudinal limiter.

FIG. 14 is a schematic cross sectional view of another embodiment of the invention having an external support coupled to a shaft longitudinally between two compliant bearings with a thrust bearing and a longitudinal limiter. The embodiment includes features described above for the device 2, such as the external support 4, shaft 6, and bearings 8 of outer rings 10 and inner rings 12 separated from each other by a spacer 38. The end support 20 can include a stationary thrust disk 18B that can engage an inner ring end surface 44 to restrict longitudinal movement of the shaft 6 in one direction relative to the end support 20. This embodiment further adds a limiter 30 on a distal end of the shaft 6 from the end support 20, so that the shaft is limited in longitudinal movement in both axial directions. The limiter 30 can have a number of embodiments. In this embodiment, the limiter 30 includes a limiter frame 32 that is coupled to the external support 4 with limiter retainers 36, such as bolts or screws. The limiter frame 32 can be fitted with a stationary thrust disk 18A. A stationary thrust disk 18A can be formed with a surface that engages with a rotational thrust disk 22. The rotational thrust disk 22 can be coupled to a shaft portion 6A. As the shaft 6 rotates relative to the external support 4 and the limiter 30 coupled thereto, the interfacing surfaces of the stationary thrust disk 18A and the rotational thrust disk 22 contact each other to limit the longitudinal movement of the shaft 6 and inner rings 12. In some embodiments, the stationary thrust disk 18A can be shaped with a curved surface to engage a corresponding curved surface in the rotational thrust disk 22. The rotational thrust disk 22 can slidably engage the stationary thrust disk 18A to accommodate a misaligned shaft 6. The limiter 30 can include an opening 52 through which a shaft portion 6D can extend that can be useful for coupling to external equipment.

Figure 15:
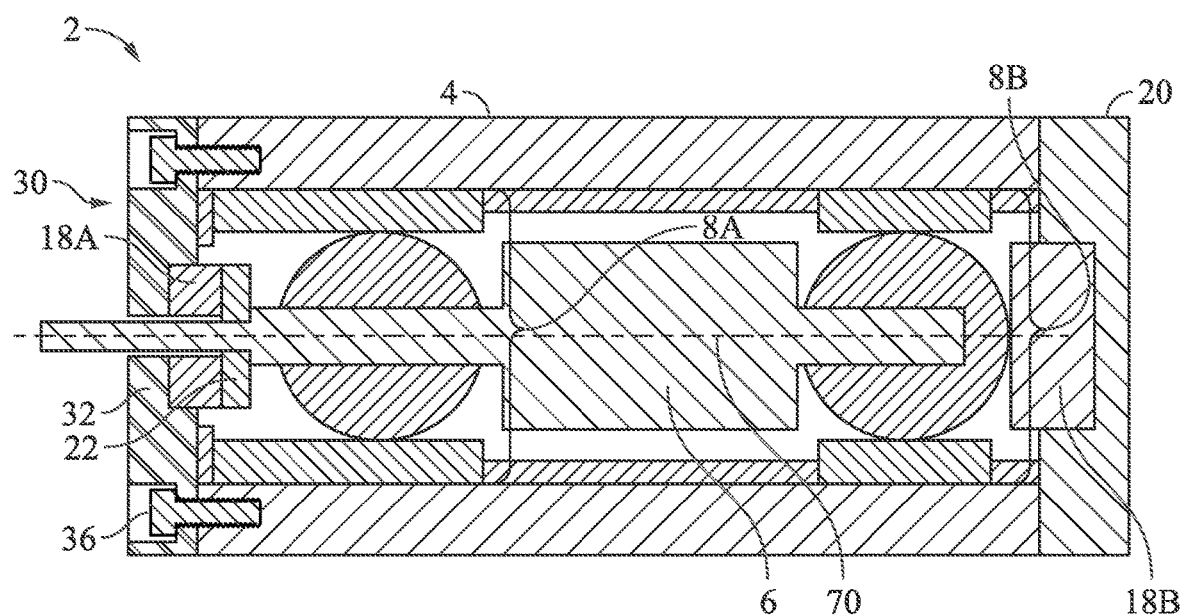
FIG. 15 is a schematic cross sectional view of another embodiment of the invention having an external support coupled to a shaft longitudinally between two compliant bearings with another embodiment of a thrust bearing, and a longitudinal limiter.

FIG. 15 is a schematic cross sectional view of another embodiment of the invention having an external support coupled to a shaft longitudinally between two compliant bearings with another embodiment of a thrust bearing, and a longitudinal limiter. This embodiment is similar to the embodiment of FIG. 14 with components similarly numbered, but varies the limiter 30 by including a planar shaped stationary thrust disk 18A coupled with the limiter frame 32 that interfaces with a planar shaped rotational thrust disk 22.

Figure 16:
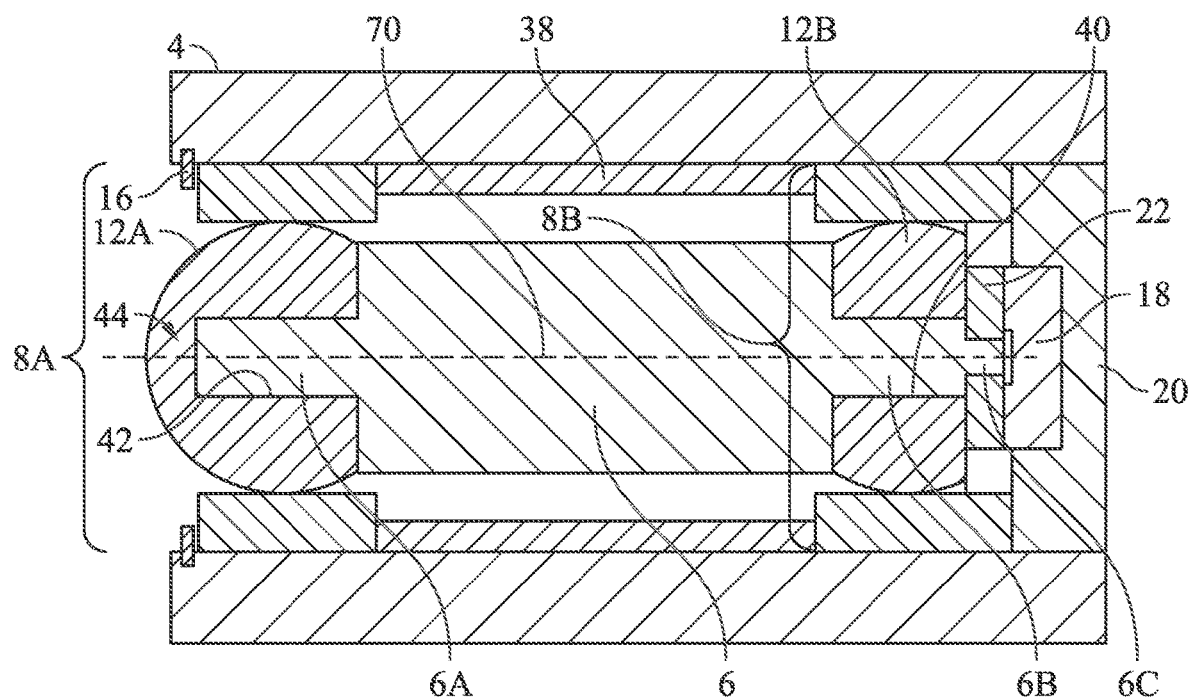
FIG. 16 is a schematic cross sectional view of another embodiment of the invention having an external support coupled to a shaft longitudinally between two compliant bearings with a thrust bearing.

FIG. 16 is a schematic cross sectional view of another embodiment of the invention having an external support coupled to a shaft longitudinally between two compliant bearings with a thrust bearing. FIG. 16 illustrates a variation of the embodiment described in FIG. 12, but shows that the bearings 8A and 8B do not need to be uniform in shape (or in size) to be able to accommodate misalignment of the shaft 6. Such nonuniformity can apply to the other embodiments throughout this disclosure. This embodiment, like FIG. 12, can be oriented with the bearing 8A higher in elevation than the bearing 8B. The orientation can help maintain the shaft 6 with the inner ring 12B coupled with a rotational thrust disk 22 in at least gravitational contact with the stationary thrust disk 18, as described above, and provide simplified removal and insertion of the shaft with the inner rings for maintenance and replacement. Although not shown, it is intended that the embodiment in FIG. 16 and others throughout this disclosure that do not explicitly show an end support 20 and/or limiter 30 can be used with an end support 20 and/or limiter 30, as described in other embodiments, for various applications.

Figure 17:
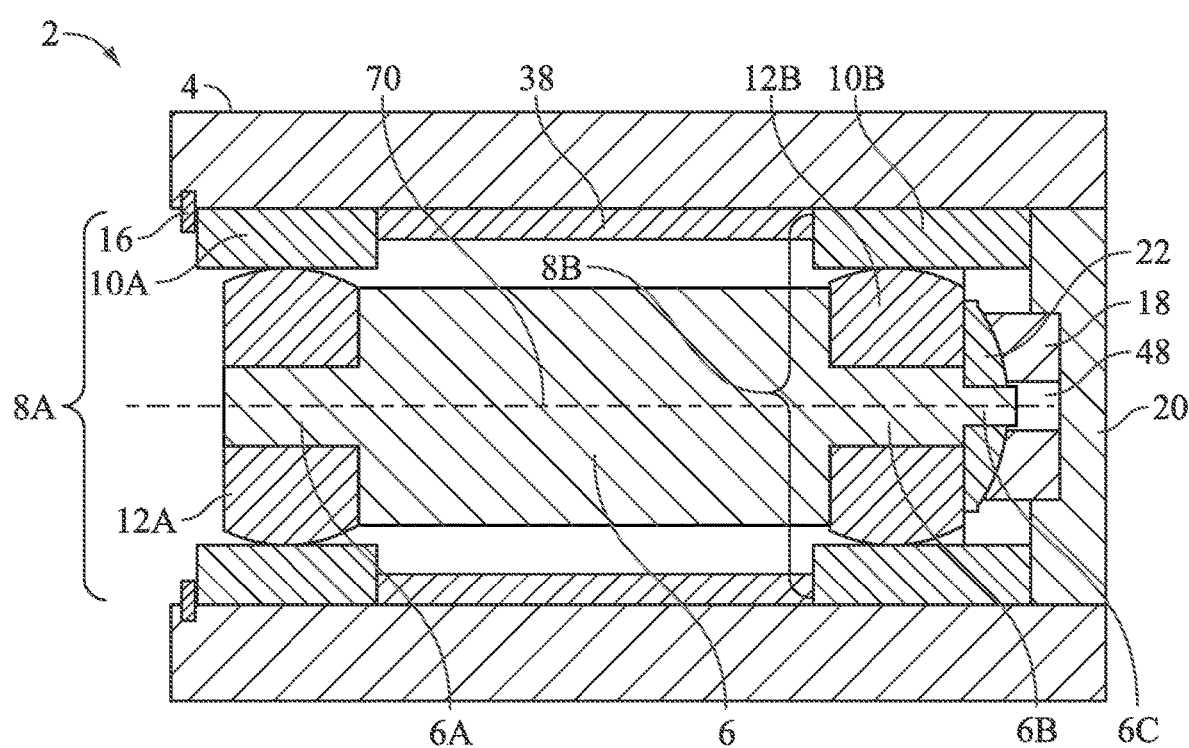
FIG. 17 is a schematic cross sectional view of another embodiment of the invention having an external support coupled to a shaft longitudinally between two compliant bearings with another embodiment of an end support, and thrust bearing.

FIG. 17 is a schematic cross sectional view of another embodiment having an external support coupled to a shaft longitudinally between two compliant bearings with another embodiment of an end support, and thrust bearing. This embodiment is similar to the embodiment described and shown in FIG. 12 with another end support and thrust bearing.

This embodiment includes similar features described for the device 2, such as the external support 4, shaft 6, and bearings 8 of outer rings 10 and inner rings 12 separated from each other by a spacer 38. The end support 20 includes a stationary thrust disk 18 with a curved shape and a longitudinal opening 48 to allow a shaft portion 6C to extend. A rotational thrust disk 22 with a correspondingly curved shape can be coupled with the shaft portion 6C and engage a side of the inner ring 12B to restrict movement of the shaft in at least one longitudinal direction. The rotational thrust disk 22 can also slide or angulate relative to the stationary thrust disk 18 to accommodate shaft misalignment. As described in other embodiments, the retainer 16 can limit the longitudinal movement of the outer ring 10A and outer right 10B, through the intermediate spacer 38. The inner rings 12 with the shaft 6 can be readily removed and inserted. Alternatively, a limiter, such as described as limiter 30 in other embodiments, can be added to this embodiment to restrain longitudinal movement of the shaft and inner rings as well.

Figure 18:
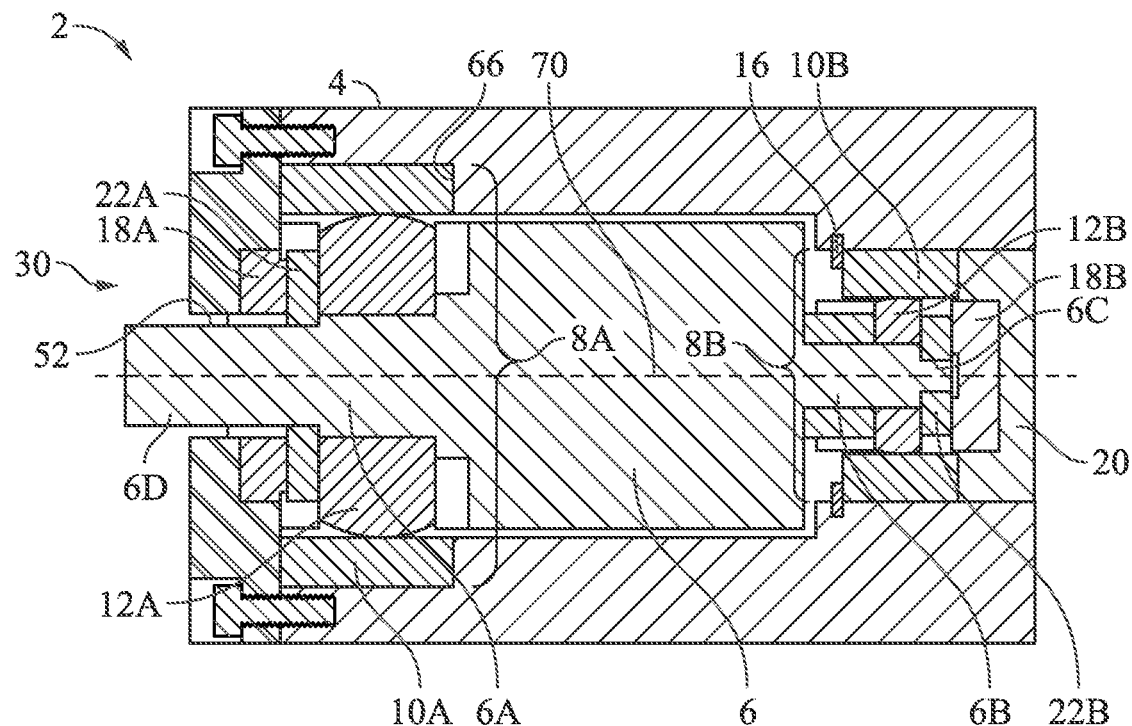
FIG. 18 is a schematic cross sectional view of another embodiment of the invention having an external support coupled to a shaft longitudinally between two compliant bearings with a thrust bearing, and longitudinal limiters for at least a portion of the bearings.

FIG. 18 is a schematic cross sectional view of another embodiment of the invention having an external support coupled to a shaft longitudinally between two compliant bearings with a thrust bearing, and longitudinal limiters for at least a portion of the bearings. The embodiment includes features described above for the device 2, such as the external support 4, shaft 6, and bearings 8 of outer rings 10 and inner rings 12. The bearing 12B is smaller in diameter than the bearing 12A, and a shaft portion 6B can be correspondingly smaller in diameter than the shaft portion 6A. The shaft portion 6B is coupled with an inner ring 12B and a further shaft portion 6C is coupled with a rotational thrust disk 22. The end support 20 includes a stationary thrust disk 18B to interface with the rotational thrust disk 22 as the shaft or eternal support rotates relative to the other. The stationary thrust disk 18B and rotational thrust disk 22 restrict longitudinal movement in one direction of the shaft 6 relative to the external support 4.

Further, the outer ring 10B is restricted from longitudinal movement separately from longitudinal movement of the outer ring 10A, so the spacer 38, shown in other embodiments, is not needed to maintain a longitudinal position of the outer rings 10. The outer ring 10B is restricted from longitudinal movement in one direction by the end support 20. The outer ring 10B is restricted from longitudinal movement in the other direction by a retainer 16, functioning as a longitudinal limiter, coupled in a groove of the external support 4.

This embodiment further includes a limiter 30 on a distal end of the shaft 6 from the end support 20, so that the shaft is limited in longitudinal movement in each axial direction. The outer ring 10A is also restricted in longitudinal movement between a shoulder 66 on the external support 4 on one side of the outer ring and the limiter 30 on the other side. The limiter 30 also includes a stationary thrust disk 18A. The shaft 6 includes a further shaft portion 6D coupled to a rotational thrust disk 22A that can longitudinally support the side of the inner ring 12A. The rotational thrust disk 22A can engage and rotate relative to the stationary thrust disk 18A. The limiter 30 can include an opening 52 through which the shaft portion 6D can extend that can be useful for coupling to external equipment.

Figure 19:
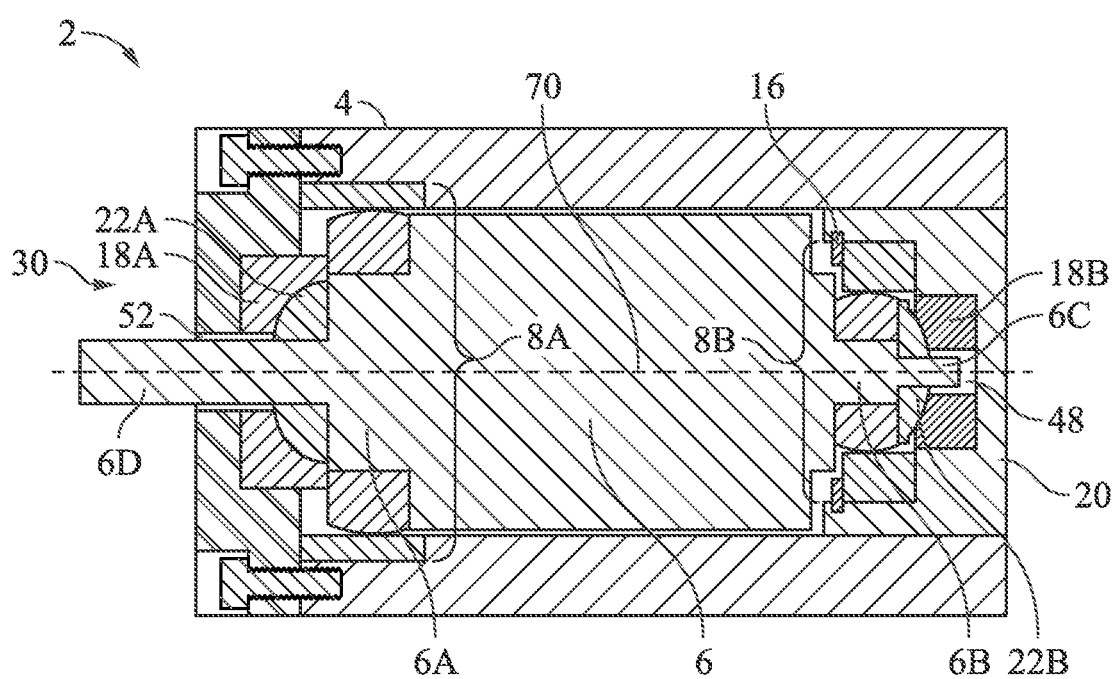
FIG. 19 is a schematic cross sectional view of another embodiment of the invention having an external support coupled to a shaft longitudinally between two compliant bearings with a thrust bearing, and another embodiment of longitudinal limiters for the bearings.

FIG. 19 is a schematic cross sectional view of another embodiment of the invention having an external support coupled to a shaft longitudinally between two compliant bearings with a thrust bearing, and another embodiment of longitudinal limiters for the bearings. The embodiment shown in FIG. 19 has similarities to the embodiment shown in FIG. 18 with variations in the end support 20 and limiter 30. The end support 20 includes components similar to the end support components described in FIG. 17. The stationary thrust disk 18B with a curved shape and a longitudinal opening 48 formed in the thrust disk for a shaft portion 6C. The shaft portion 6C can be coupled with a rotational thrust disk 22B. The rotational thrust disk 22B can interface with a correspondingly curved shape to the curved shape of the stationary thrust disk 18B. The rotational thrust disk 22B can slide along the curved shape of the stationary thrust disk 18B and align with a contact surface on the side of the inner ring 12B, even when the shaft and therefore ring is misaligned with an outer ring longitudinal axis.

The limiter 30 shown in FIG. 19 has similarities to the embodiment shown in FIG. 14. The limiter 30 includes a limiter frame 32 that is coupled to the external support 4. A stationary thrust disk 18A can be coupled with the limiter frame 32, and a rotational thrust disk 22A can be coupled to shaft portion 6D of the shaft 6. The stationary thrust disk 18A can be formed with a curved shape to engage a corresponding curved shape of the rotational thrust disk 22A. The rotational thrust disk 22A can slidably engage the surface of the stationary thrust disk 18A, so that a contact surface of the rotational thrust disk 22A adjacent the shaft portion 6A can align with the face of the shaft portion, even with a misaligned shaft 6. The limiter 30 can include an opening 52 through which a shaft portion 6D can extend that can be useful for coupling to external equipment.

Figure 20A:
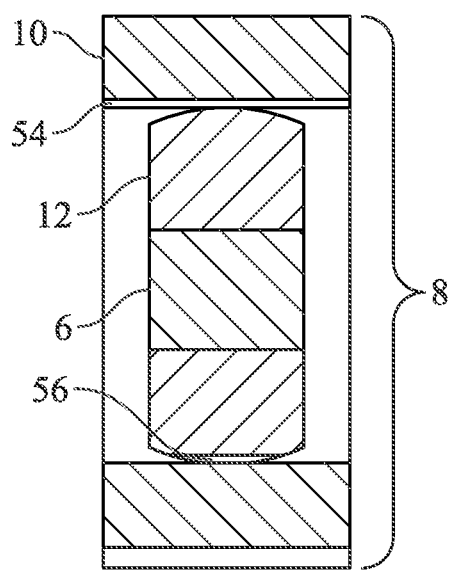
FIG. 20A is a schematic cross sectional view of another embodiment of the invention having a compliant bearing with flow paths.
Figure 20B:
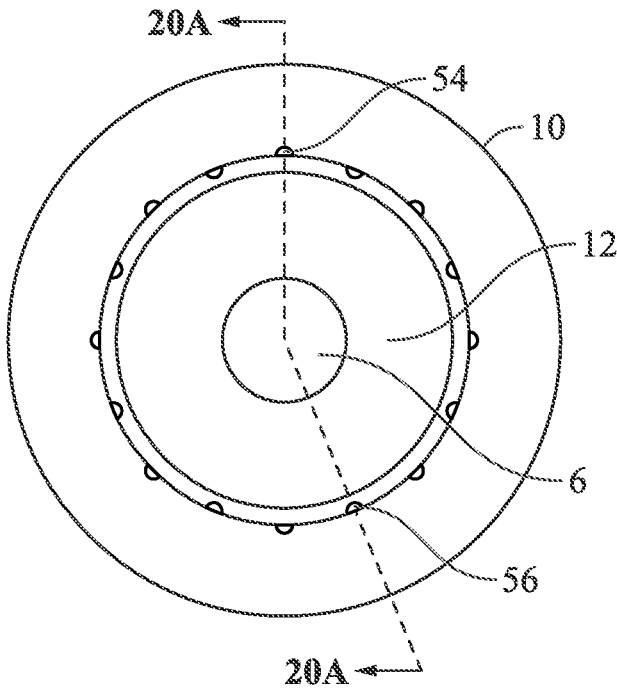
FIG. 20B is a schematic end view of the embodiment of the compliant bearing of FIG. 20A.
Figure 20C:
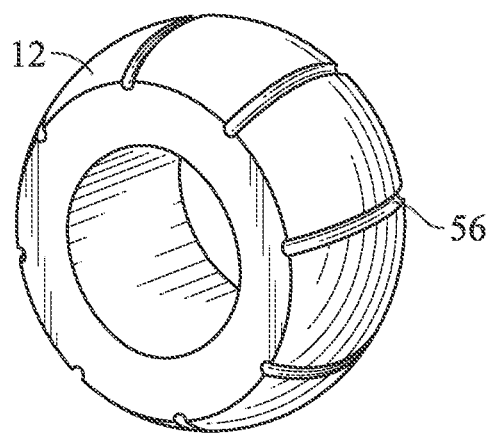
FIG. 20C is a schematic perspective view of an embodiment of an inner ring of the compliant bearing of FIG. 20A, the inner ring having longitudinal flow paths.
Figure 20D:
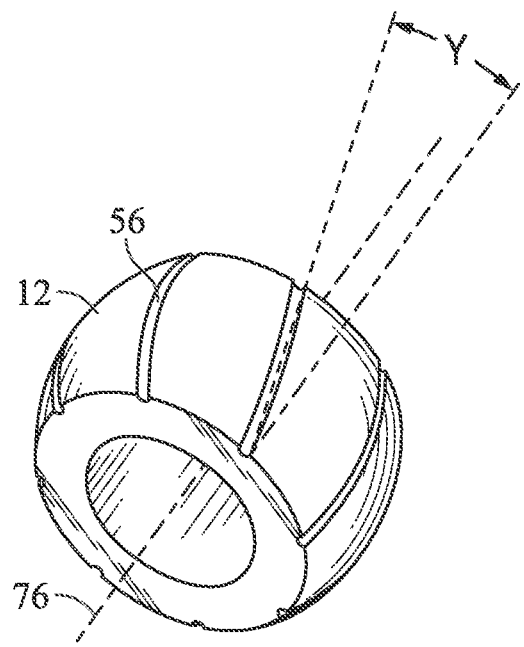
FIG. 20D is a schematic perspective view of another embodiment of the inner ring of the compliant bearing of FIG. 20A, the inner ring flow paths being formed at an angle to a longitudinal axis.

FIG. 20A is a schematic cross sectional view of another embodiment of the invention having a compliant bearing with flow paths. FIG. 20B is a schematic end view of the embodiment of the compliant bearing of FIG. 20A. FIG. 20C is a schematic perspective view of an embodiment of an inner ring of the compliant bearing of FIG. 20A, the inner ring having longitudinal flow paths. FIG. 20D is a schematic perspective view of another embodiment of the inner ring of the compliant bearing of FIG. 20A, the inner ring flow paths being formed at an angle to an outer ring longitudinal axis. An embodiment of the invention provides flow paths. In some embodiments, the flow paths can be formed through the outer ring 10 as flow paths 54, the inner ring 12 as flow paths 56, or likely both rings. In the embodiment of FIGS. 20A-20D, the flow paths 54 and/or 56 can be formed close to the interface between the outer ring and the inner ring. The location of the flow paths can be placed where the fluid with the particulates would likely flow through the gap between the outer ring and inner ring that allows relative movement in the degrees of freedom described above. Thus, some flow paths could be formed through the widths of the outer ring 10 and the inner ring 12. The flow paths 54 and/or 56 can also be grooves that are open on the inner perimeter of the outer ring, the outer perimeter of the inner ring, or a combination thereof. In other embodiments, the flow paths 54 and/or 56 can be openings having a fully enclosed periphery. Further, the flow paths 54 and/or 56 can be at an angle "γ" to a parallel line of an inner ring longitudinal axis 76. For purposes herein, a "longitudinal flow path" includes flow paths at angles to the longitudinal axis that are not transverse to the longitudinal axis, that is, having a least a component of the angle that is longitudinal. Such flow paths can help in allowing particulates in the fluid to pass through the bearing to mitigate clogging and trapping of the particulates around the sliding surface of the bearing. The flow paths can also provide cooling to the bearing from the fluid passing through the flow paths. The angle can provide more contact time of the passing fluid over the surface of the outer ring, inner ring, or both rings. The flow paths also help equalize pressures on both sides of the bearing.

Figure 21A:
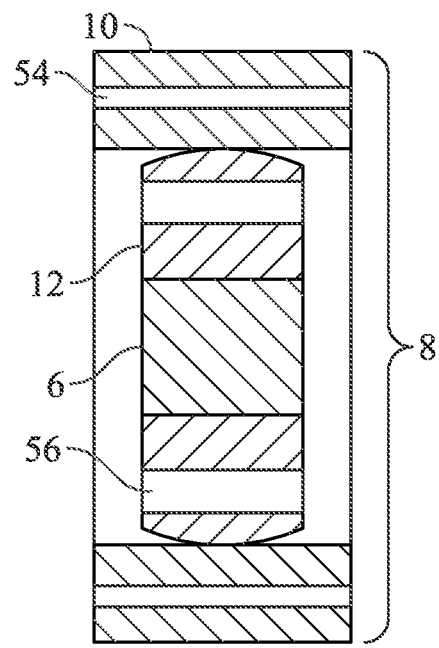
FIG. 21A is a schematic cross sectional view of another embodiment of the invention having a compliant bearing with flow paths.
Figure 21B:
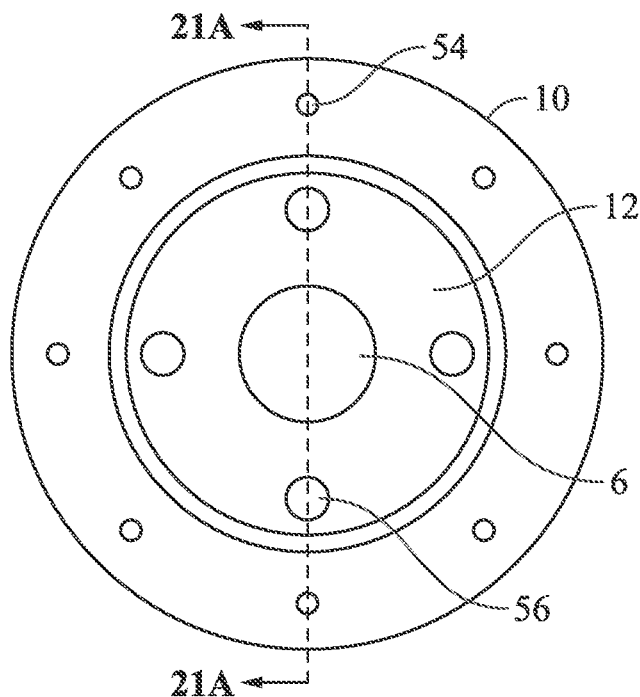
FIG. 21B is a schematic end view of the embodiment of the compliant bearing of FIG. 21A.
Figure 21C:
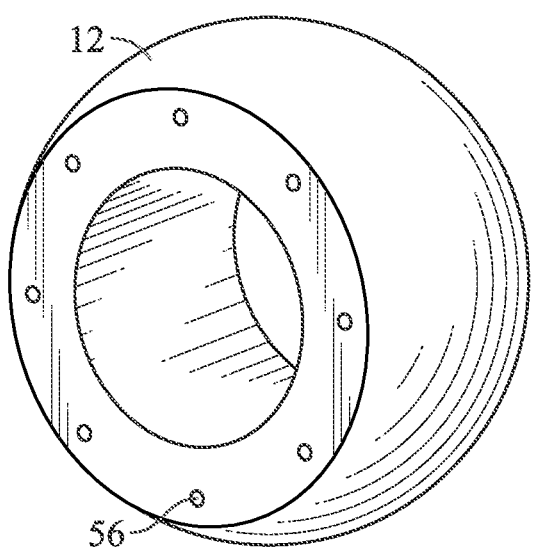
FIG. 21C is a schematic perspective view of an embodiment of an inner ring of the compliant bearing of FIG. 21A, the inner ring having flow paths.

FIG. 21A is a schematic cross sectional view of another embodiment of the invention having a compliant bearing with flow paths. FIG. 21B is a schematic end view of the embodiment of the compliant bearing of FIG. 21A. FIG. 21C is a schematic perspective view of an embodiment of an inner ring of the compliant bearing of FIG. 21A, the inner ring having flow paths. This embodiment provides flow paths within the walls of the outer ring 10 for flow paths 54, the inner ring 12 for flow paths 56, or likely both rings. In this embodiment, the flow paths 54 and/or 56 as openings do not affect the contact surface of the outer and inner rings at their interface. The size of the flow paths can be varied depending on particulates, flow volume, and pressure and other considerations without affecting the interface contact surfaces and can help equalize pressures on both sides of the bearing. Without limitation, the flow paths 54 and/or 56 can also provide cooling for the bearing.

Figure 22:
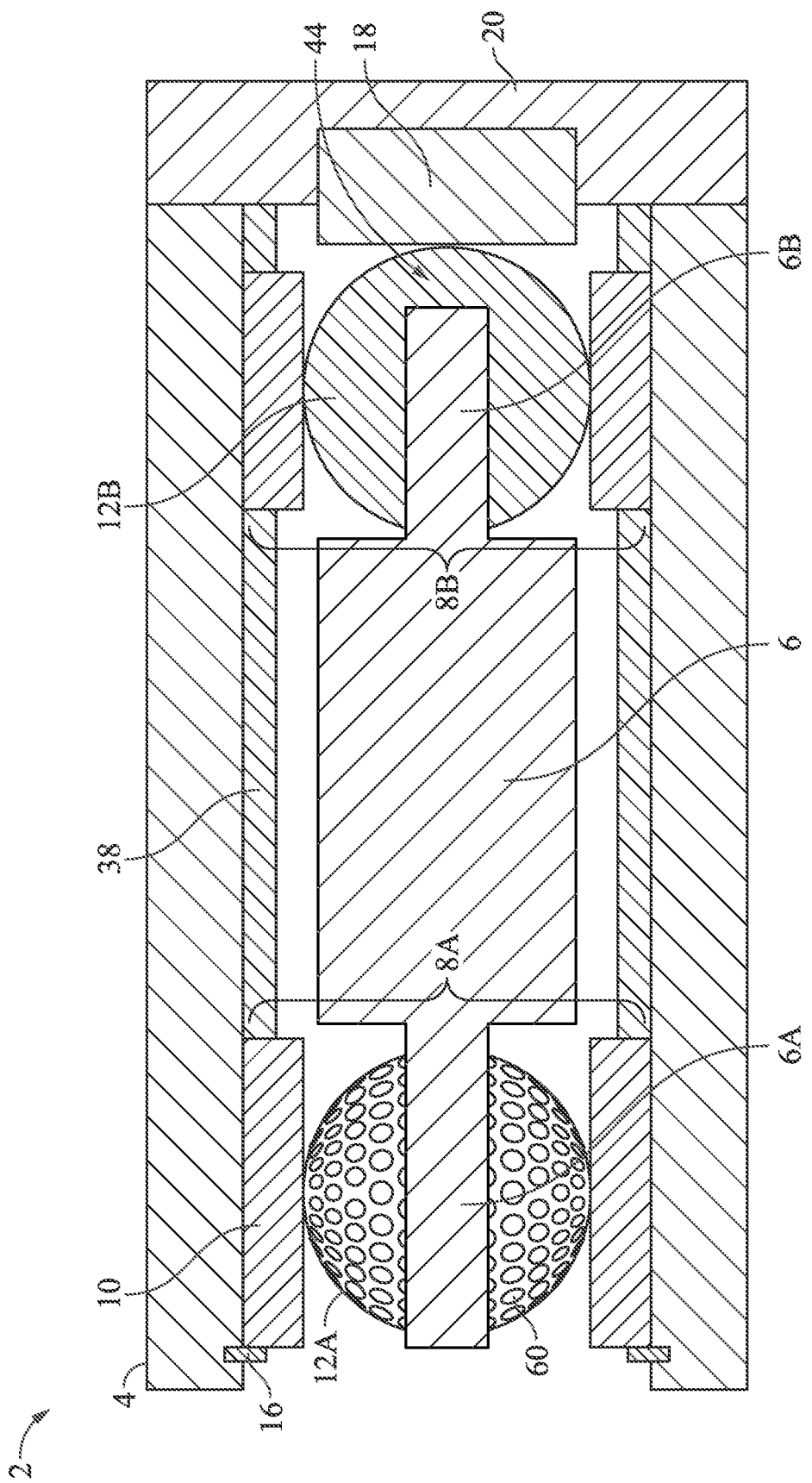
FIG. 22 is a schematic cross sectional view of another embodiment having an external support coupled to a shaft longitudinally between two compliant bearings with an inner ring of at least one of the bearings having an embodiment of a three-dimensional patterned surface.

FIG. 22 is a schematic cross sectional view of another embodiment of the invention having an external support coupled to a shaft longitudinally between two compliant bearings with an inner ring of at least one of the bearings having an embodiment of a three-dimensional patterned surface 60. The surface of an inner ring 12 could also be formed with three-dimensional patterned surfaces on the inner ring surface, including indentions, concavities, dents, and other depressions. One example of indentions is illustrated as dimples. Similarly, the indentions can help in allowing particulates in the fluid to pass through the bearing to reduce clogging and trapping of the particulates between the sliding surfaces of the bearing. Other elements noted in the figure have been described in other embodiments.

Figure 23:
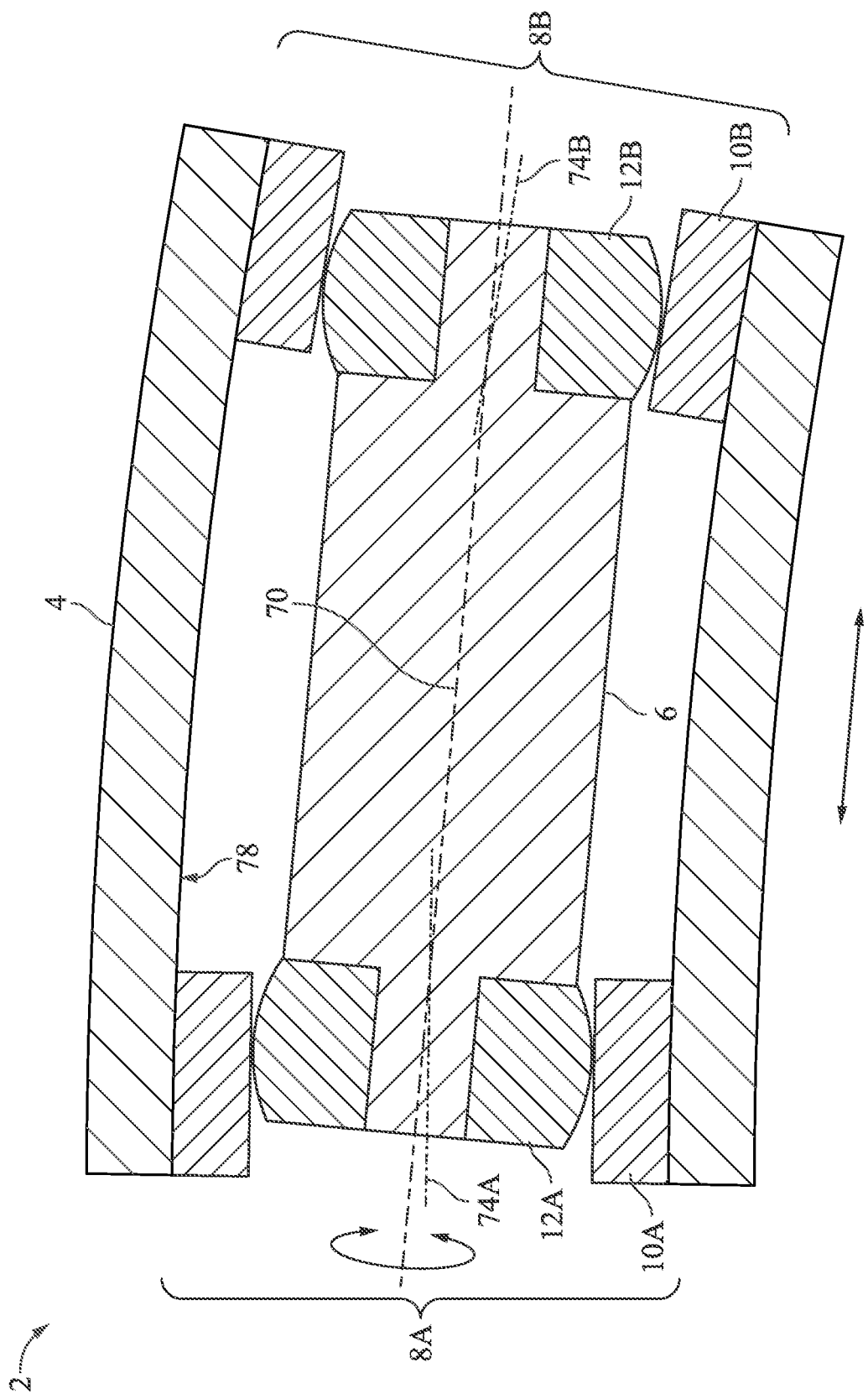
FIG. 23 is a schematic cross sectional view of another embodiment of the invention having a shaft longitudinally between two bearings in a curved external support.

FIG. 23 is a schematic cross sectional view of another embodiment of the invention having a shaft longitudinally between two bearings in a curved external support. The ability of the bearings 8 to accommodate misalignment is also useful for embodiments having an external support 4 with a curved inner surface 78 that supports the bearing outer rings 10. The device 2 has been described above with bearings 8A and 8B coupled to a shaft 6. The outer ring 10A of bearing 8A is oriented with outer ring longitudinal axis 74A in a portion of the curved external support 4. The outer ring 10B of bearing 8B is oriented with outer ring longitudinal axis 74B in a different portion of the curved inner surface 78 of the external support 4, so that the outer ring longitudinal axis 74A is not parallel with the outer ring longitudinal axis 74B. The shaft 6 with the inner rings 12A and 12B can accommodate the misalignment of the two bearings by orienting with the four degrees of freedom described above to some angle relative to the outer ring longitudinal axes 74A and 74B. The shaft longitudinal axis 70 can be situated at an angle to at least one and likely both of the outer ring longitudinal axes 74A and 74B.

Other and further embodiments utilizing one or more aspects of the inventions described above can be devised without departing from the disclosed invention as defined in the claims. For example, the external bearing shape could be a series of incremental facets that collectively approximate and function similar to a spherical or barrel shape. These variations are considered a "curved surface" for purposes herein. Other variations are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A shaft and bearing assembly, comprising:
a shaft;
a first bearing coupled to the shaft comprising:
an outer ring having an inside periphery defining a longitudinal axis; and
an inner ring having an outside periphery configured to rotatably fit within the inside periphery of the outer ring, the bearing configured to allow four degrees of freedom movement between the inner ring and the outer ring of relative rotational movement around the longitudinal axis, relative angular movement in a plurality of directions transverse to the longitudinal axis, and relative longitudinal movement along the longitudinal axis wherein the outer ring inside periphery is cylindrical in a longitudinal direction and the inner ring outside periphery is curved in the longitudinal direction; and
a second bearing coupled to the shaft at a different location than the first bearing, comprising:
an outer ring having an inside periphery defining a longitudinal axis; and
an inner ring having an outside periphery configured to rotatably fit within the inside periphery of the outer ring, the bearing configured to allow four degrees of freedom movement between the inner ring and the outer ring of relative rotational movement around the longitudinal axis, relative angular movement in a plurality of directions transverse to the longitudinal axis, and relative longitudinal movement along the longitudinal axis.

2. The shaft and bearing assembly of claim 1, wherein the outer ring of the first bearing and the outer ring of the second bearing are coupled.

3. The shaft and bearing assembly of claim 1, wherein the inner ring outside periphery of at least one of the bearings is spherical in the longitudinal direction.

4. The shaft and bearing assembly of claim 1, wherein the inner ring outside periphery comprises a curved surface having a radius less than a radius of the outer ring inside periphery.

5. The shaft and bearing assembly of claim 1, wherein the inner ring is constrained in a first direction along the longitudinal axis with the outer ring but not constrained in an opposite direction along the longitudinal axis independent to the bearing.

6. The shaft and bearing assembly of claim 1, wherein at least one of the outer ring and inner ring comprises a longitudinal flow path configured to allow fluid to flow longitudinally through the bearing.

7. The shaft and bearing assembly of claim 1, wherein at least one of the outer ring and inner ring is formed with indentions.

8. The shaft and bearing assembly of claim 1, wherein at least one of the outer ring and inner ring comprises a material having tungsten carbide, ceramic, "polycrystalline diamond", "diamond like carbon", or a combination thereof.

9. A rotatable electromagnetic device, comprising:
a stator having an inside periphery, and configured to be coupled to a bearing outer ring with an inside periphery defining a longitudinal axis; and
a rotor having an outside periphery configured to rotationally fit within the inside periphery of the stator and comprising at least one bearing inner ring with an outside periphery configured to rotatably fit within the inside periphery of the bearing outer ring to establish a bearing, and the bearing inner ring configured to allow four degrees of freedom movement between the inner ring and the outer ring of relative rotational movement around the longitudinal axis, relative angular movement in a plurality of directions transverse to the longitudinal axis, and relative longitudinal movement along the longitudinal axis.

10. The device of claim 9, wherein the outer ring inside periphery is cylindrical in a longitudinal direction and the inner ring outside periphery is curved in the longitudinal direction.

11. The bearing of claim 9, wherein the outer ring inside periphery is cylindrical in a longitudinal direction and the inner ring outside periphery is spherical in the longitudinal direction.

12. The device of claim 9, wherein the inner ring outside periphery comprises a curved surface having a radius less than a radius of the outer ring inside periphery.

13. The device of claim 9, wherein longitudinal movement along the longitudinal axis of the rotor relative to the stator in at least one direction is constrained by a stop in the device independent of the bearing.

14. The device of claim 9, wherein at least one of the outer ring and inner ring comprises a longitudinal flow path configured to allow fluid to flow through the bearing.

\* \* \* \* \*